United States Patent
Sweeney et al.

(10) Patent No.: US 8,938,275 B2
(45) Date of Patent: *Jan. 20, 2015

(54) SYSTEM AND METHOD FOR DISPLAYING INFORMATION ASSOCIATED WITH A CELLULAR DEVICE ON A USER SPECIFIED DISPLAY UNIT

(71) Applicant: CenturyLink Intellectual Property LLC, Denver, CO (US)

(72) Inventors: Jeffrey M. Sweeney, Olathe, KS (US); Kelsyn D. S. Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,656

(22) Filed: Dec. 9, 2013

(65) Prior Publication Data
US 2014/0099932 A1 Apr. 10, 2014

Related U.S. Application Data

(63) Continuation of application No. 12/277,064, filed on Nov. 24, 2008, now Pat. No. 8,630,683.

(51) Int. Cl.
| | |
|---|---|
| H04B 1/38 | (2006.01) |
| H04B 7/00 | (2006.01) |
| H04W 4/00 | (2009.01) |
| H04M 1/57 | (2006.01) |
| H04W 24/08 | (2009.01) |
| H04W 24/10 | (2009.01) |

(52) U.S. Cl.
CPC .............. *H04M 1/575* (2013.01); *H04W 24/08* (2013.01); *H04W 24/10* (2013.01)
USPC ................ 455/566; 455/514; 370/328; 726/2

(58) Field of Classification Search
USPC .................. 455/566, 514; 370/328; 726/2
See application file for complete search history.

(56) References Cited

U.S. PATENT DOCUMENTS

| | | | | |
|---|---|---|---|---|
| 5,517,549 | A * | 5/1996 | Lee ................................ | 455/407 |
| 6,760,580 | B2 * | 7/2004 | Robinson et al. .......... | 455/412.2 |
| 8,229,407 | B2 * | 7/2012 | Bocking et al. ............... | 455/415 |
| 8,295,215 | B2 * | 10/2012 | Morrill et al. ................. | 370/310 |
| 8,630,683 | B2 | 1/2014 | Sweeney et al. | |
| 8,799,451 | B2 * | 8/2014 | Raleigh ......................... | 709/224 |
| 2003/0093327 | A1 * | 5/2003 | Roberts et al. ................. | 705/26 |

(Continued)

OTHER PUBLICATIONS

U.S. Appl. No. 12/277,064; Non Final Office Action dated Dec. 22, 2011; 14 pages.

(Continued)

*Primary Examiner* — Bobbak Safaipour
(74) *Attorney, Agent, or Firm* — Swanson & Bratschun, L.L.C.

(57) ABSTRACT

Embodiments of the present invention include a method for displaying information associated with a cellular device on a display unit. In one embodiment, the method includes monitoring for a signal transmitted by a cellular device. In response to detecting the signal from the cellular device, the method determines an identity and a call status of the cellular device from data associated with the signal. The method transmits the identity and the call status of the cellular device to a user specified device to display the identity and the call status on the display unit associated with the user specified device.

20 Claims, 4 Drawing Sheets

(56) References Cited

U.S. PATENT DOCUMENTS

| | | | |
|---|---|---|---|
| 2003/0229900 A1* | 12/2003 | Reisman | 725/87 |
| 2004/0083291 A1* | 4/2004 | Pessi et al. | 709/227 |
| 2004/0141594 A1* | 7/2004 | Brunson et al. | 379/88.12 |
| 2005/0033852 A1* | 2/2005 | Tenhunen | 709/229 |
| 2005/0114493 A1* | 5/2005 | Mandato et al. | 709/223 |
| 2005/0159143 A1* | 7/2005 | Kim | 455/414.4 |
| 2005/0169446 A1* | 8/2005 | Randall et al. | 379/93.23 |
| 2005/0277406 A1* | 12/2005 | Diroo et al. | 455/412.2 |
| 2005/0277431 A1* | 12/2005 | White | 455/466 |
| 2006/0007899 A1* | 1/2006 | White | 370/338 |
| 2007/0288627 A1* | 12/2007 | Abella et al. | 709/224 |
| 2008/0291013 A1* | 11/2008 | McCown et al. | 340/539.13 |
| 2009/0059822 A1* | 3/2009 | Morrill et al. | 370/310 |
| 2009/0061924 A1* | 3/2009 | Morrill et al. | 455/552.1 |
| 2009/0092080 A1* | 4/2009 | Balasubramanian et al. | 370/328 |
| 2009/0164547 A1* | 6/2009 | Ch'ng et al. | 709/201 |
| 2009/0247170 A1* | 10/2009 | Balasubramanian et al. | 455/445 |
| 2009/0279430 A1* | 11/2009 | Huber et al. | 370/230.1 |
| 2009/0280853 A1* | 11/2009 | Brisebois et al. | 455/522 |
| 2009/0285166 A1* | 11/2009 | Huber et al. | 370/329 |
| 2009/0286509 A1* | 11/2009 | Huber et al. | 455/410 |
| 2009/0286512 A1* | 11/2009 | Huber et al. | 455/411 |
| 2009/0288139 A1* | 11/2009 | Huber et al. | 726/2 |
| 2009/0288140 A1* | 11/2009 | Huber et al. | 726/2 |
| 2009/0288152 A1* | 11/2009 | Huber et al. | 726/6 |
| 2010/0027510 A1* | 2/2010 | Balasubramanian et al. | 370/332 |
| 2010/0027521 A1* | 2/2010 | Huber et al. | 370/338 |
| 2010/0040019 A1* | 2/2010 | Tinnakornsrisuphap et al. | 370/331 |
| 2010/0041364 A1* | 2/2010 | Lott et al. | 455/404.1 |
| 2010/0048160 A1* | 2/2010 | Lekutai | 455/404.1 |
| 2010/0048216 A1* | 2/2010 | Sundarraman et al. | 455/444 |
| 2010/0085913 A1* | 4/2010 | Subrahmanya | 370/328 |
| 2010/0128708 A1* | 5/2010 | Liu et al. | 370/338 |
| 2010/0135201 A1* | 6/2010 | Lewis et al. | 370/328 |
| 2010/0136943 A1* | 6/2010 | Hirvela et al. | 455/404.1 |
| 2010/0248640 A1* | 9/2010 | MacNaughtan et al. | 455/67.11 |
| 2012/0149377 A1* | 6/2012 | Su et al. | 455/438 |
| 2012/0258746 A1* | 10/2012 | Tokgoz et al. | 455/501 |
| 2013/0288678 A1* | 10/2013 | Lott et al. | 455/435.1 |

OTHER PUBLICATIONS

U.S. Appl. No. 12/277,064; Decision or Pre-Appeal Brief dated Nov. 30, 2012; 2 pages.

U.S. Appl. No. 12/277,064; Non Final Rejection dated Apr. 10, 2013; 31 pages.

U.S. Appl. No. 12/277,064; Notice of Allowance dated Sep. 9, 2013; 27 pages.

U.S. Appl. No. 12/277,064; Issue Notification dated Dec. 24, 2013; 1 page.

* cited by examiner

SYSTEM AND METHOD FOR DISPLAYING INFORMATION ASSOCIATED WITH A CELLULAR DEVICE ON A USER SPECIFIED DISPLAY UNIT

CROSS REFERENCE TO RELATED APPLICATION

This application is a continuation of U.S. patent application Ser. No. 12/277,064, filed Nov. 24, 2008, by Jeffrey M. Sweeney et al. and entitled, "System and Method for Displaying Information Associated With a Cellular Device on a User Specified Display Unit,", which is hereby incorporated by reference in its entirety.

BACKGROUND

Current technology exists to display caller identification associated with a wired a telephone on a television screen. However, many households have eliminated the use of a wired telephone and have switched to cellular service as their only means of communication. Therefore, embodiments of the present invention include a method for displaying information, such as, but not limited to, caller identification, associated with a cellular device on a display unit.

SUMMARY

In one embodiment, a method is presented for displaying information associated with a cellular device on a display unit. The method includes monitoring for a signal transmitted by a cellular device. In response to detecting the signal from the cellular device, the method determines an identity and a call status of the cellular device from data associated with the signal. The method transmits the identity and the call status of the cellular device to a user specified device to display the identity and the call status on the display unit associated with the user specified device.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
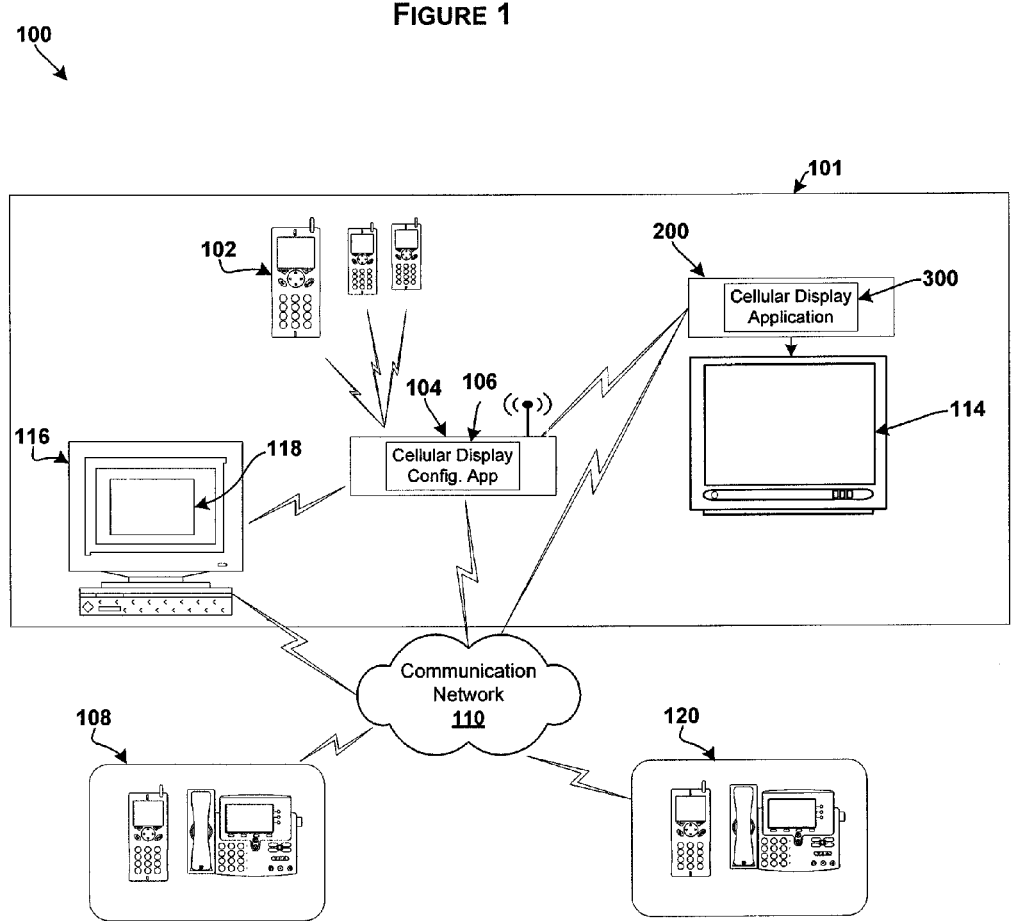
FIG. 1 depicts an embodiment of a network environment in which the illustrative embodiments may be implemented.

FIG. 1 depicts a network environment 100 in which the illustrative embodiments may be implemented for displaying information associated with a cellular device on a display unit. In the depicted embodiment, a residential cellular access router 104, located in a residential location 101, enables cellular devices, such as, but not limited to, cellular device 102 to communicate with other communication devices, such as, communication devices 108 and 120, over a network, such as, communication network 110.

In some embodiments, cellular access router 104 is a femto cell. A femto cell is a small cellular base station, typically designed for use in residential or small business environments. Femto cells connect cellular devices to a cellular service provider's network via a broadband internet connection, such as, but not limited to, a DSL and/or a cable connection. Current femto cell designs typically support 2 to 5 mobile phones in a residential setting. Femto cells allow service providers to extend service coverage indoors, especially where access would otherwise be limited or unavailable.

Cellular device 102 is a hand-held wireless communication device, such as, but not limited to, a cellular phone or a personal digital assistant (PDA). In some embodiments, cellular device 102 may also have wireless internet capability to communicate with other mobile devices and/or computing devices over communication network 110. In addition, cellular device 102 is associated with special codes/identifiers for uniquely identifying cellular device 102. In some embodiments, the special codes/identifiers are also used to identify a service provider associated with cellular device 102. Additionally, in some embodiments, the special codes/identifiers may also be used to identify an owner/subscriber associated with cellular device 102.

Communication network 110 provides a communication medium for cellular device 102 to communicate with other communication devices and/or data processing systems. Communication network 110 may include wireless and wired networks, data and/or voice networks, such as, but not limited to, the Internet, the cellular network system, the publicly switched telephone networks (PSTN) including an Signaling System 7 (SS7) network and/or other types of communication networks.

In one embodiment, a user connects computing device 116 to residential cellular access router 104 via a direct Ethernet connection and/or via communication network 110 to configure residential cellular access router 104 using cellular display configuration application 106. For example, in one embodiment, a user may use configuration screen 118 to register an identifier, such as, but not limited to, a mobile identification number, for each cellular device used in a household. In addition, in some embodiments, a user may use configuration screen 118 to register an identifier, such as, but not limited to, an IP address, associated with a user specified device for displaying information associated with a cellular device detected by residential cellular access router 104.

For example, in one embodiment, a user may register the IP address associated with a set-top box 200 for displaying information associated with detected cellular devices on television 114. In some embodiments, set-top box 200 may include a cellular display application 300 for processing the data received from residential cellular access router 104. For example, in one embodiment, cellular display application 300 receives data that includes the identity and call status of a cellular device detected by residential cellular access router 104. Cellular display application 300 generates a user interface that includes the received data and displays the user interface on television 114. Further, in some embodiments, cellular display application 300 may overlay the generated user interface over an image depicted on television 114. Alternatively, in some embodiments cellular display application 300 may display the generated user interface on a specified channel.

Additionally, in some embodiments, cellular display application 300 may be executed on other user specified devices, such as, but not limited to, computing device 116 and/or communication devices 120 for displaying information associated with detected cellular devices on the user specified devices. For example, in one embodiment, a user may configure residential cellular access router 104 to transmit the data associated with detected cellular devices to a particular communication/cellular device.

Figure 2:
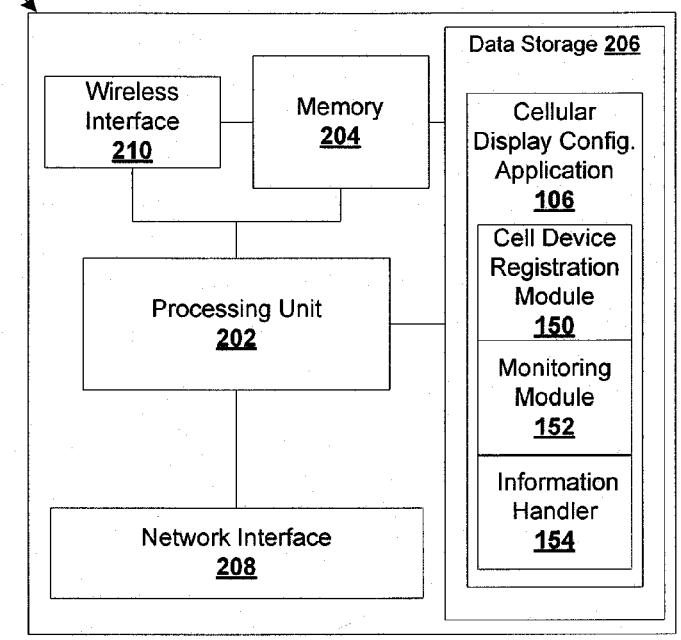
FIG. 2 depicts an embodiment of a cellular access router in accordance with the illustrative embodiments.

FIG. 2 depicts an embodiment of cellular access router 104 in accordance with the disclosed embodiments. In the depicted embodiment, cellular access router 104 includes a processing unit 202, memory 204, data storage 206, network interface 208, and wireless interface 210.

Processing unit 202 comprises one or more microprocessors for executing computer executable instructions. For example, processing unit 202 may execute instructions associated with cellular display configuration application 106. In some embodiments, memory 204 is random access memory (RAM) used for temporarily storing instructions for an executing application, such as, but not limited to, cellular display configuration application 106.

Network interface 208 includes one or more communication ports, such as, but not limited to, an Ethernet and or cable connection for connecting cellular access router 104 to communication network 110 and/or other computing devices, such as, but not limited to, computing device 116 and/or set-top box 200.

Wireless interface 210 includes a radio antenna for detecting cellular signals and for transmitting voice and data wirelessly using radio waves. In addition, in some embodiments, wireless interface 210 may include wireless Internet capability, such as, but not limited to, using the Wireless Application Protocol (WAP), for enabling mobile devices to access the Internet wirelessly.

Data storage 206 includes one or more non-volatile storage devices, such as, but not limited to, a hard disk drive. Data storage 206 stores computer instructions, such as, but not limited to, an operating system, and/or other applications, such as, but not limited to, cellular display configuration application 106 for displaying information associated with detected cellular devices on a user specified device.

For example, in the depicted embodiment, cellular display configuration application 106 includes a cellular device registration module 150, a monitoring module 152, and an information handler 154. In one embodiment, cellular device registration module 150 comprises computer executable instructions for generating configuration screen 118 and for performing the associated functions of registering cellular devices and display devices with residential cellular access router 104. Additionally, in some embodiments, cellular device registration module 150 may comprise computer executable instructions for enabling a user to block a detected cellular device from using/communicating over cellular access router 104.

Monitoring module 152 comprises computer executable instructions for detecting cellular signals within range of residential cellular access router 104. In some embodiments, monitoring module 152 identifies a detected cellular device using the special code/identifiers, such as, but not limited to, a mobile identification number and/or an international mobile subscriber identity (IMSI) number, transmitted by a cellular device. In addition, in some embodiments, monitoring module 152 determines a call status associated with a detected cellular device. The term call status, as referenced herein, refers to whether the device is actively communicating with another communication device. For example, in some embodiments, based on the frequency range of the signal transmitted by a detected cellular device, monitoring module 152 determines whether the detected cellular device is communicating with another communication device over network 110. In some embodiments, monitoring module 152 also comprises computer executable instructions for determining a phone number associated with a communication device in communication with a detected cellular device. For example, monitoring module 152 may capture a dial out phone number and/or the caller ID on an incoming call.

Information handler 154 comprises computer executable instructions for transmitting the information associated with a detected cellular device to a user specified device for displaying the information. For example, in one embodiment, information handler 154 transmits the identity, the call status, and the phone number associated with a communication device that is in communication with the detected cellular device to a user specified device to display the information on a display unit. Additionally, in some embodiments, information handler 154 comprises computer executable instructions for maintaining and displaying a log file that includes a time interval indicating a time associated with the detection of a cellular device by cellular access router 104. For example, the log file may include the time and date cellular access router 104 detects a signal transmitted by a cellular device. Thus, a user may view the log file to determine when a cellular device was present. In some embodiments, the log file may include calling activities associated with a detected cellular device. For example, in one embodiment, the calling activities may include a call time, call duration, and a phone number associated with a communication device that is in communication with the detected cellular device.

In addition, in some embodiments, information handler 154 may include computer executable instructions for enabling a user to listen live to audio associated with communications made with the cellular device. For instance, in one embodiment, cellular access router 104 may stream the audio to the audio output speakers of television 114. In some embodiments, information handler 154 may also enable a user to record audio associated with communications made with the cellular device.

Figure 3:
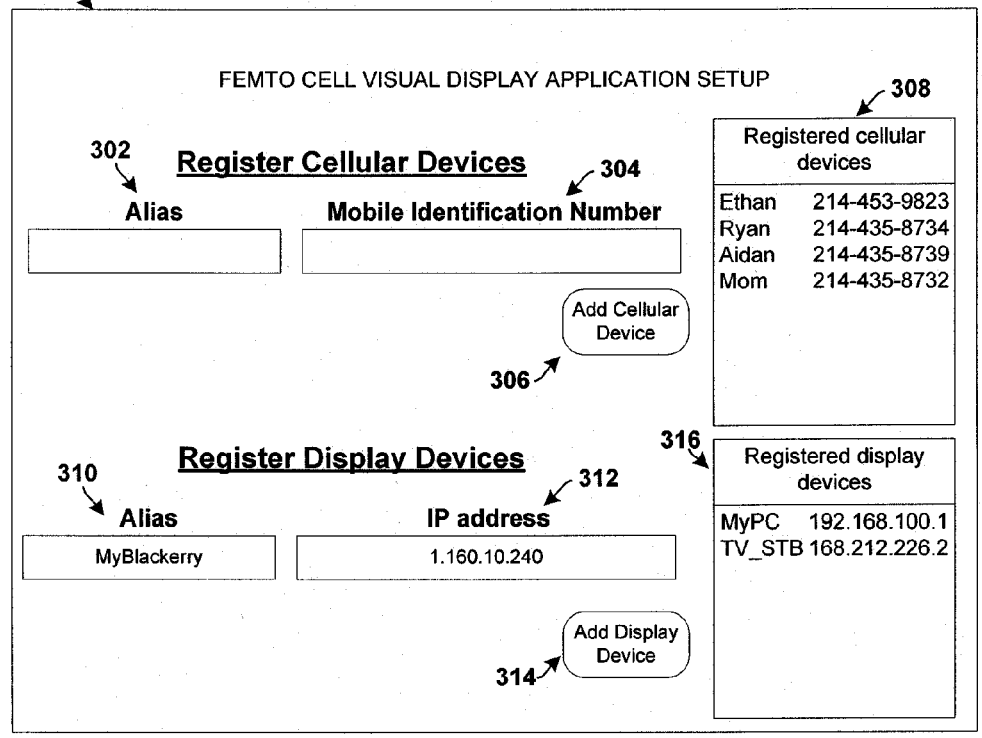
FIG. 3 depicts an embodiment of a user interface for registering devices with the cellular access router.

FIG. 3 depicts an embodiment of configuration screen 118 for registering devices with cellular access router 104. For example, a user may connect computing device 116 to cellular access router 104 via a direct Ethernet connection and/or via communication network 110 to configure residential cellular access router 104 using configuration screen 118. For instance, in one embodiment, configuration screen 118 may be access by entering an IP address associated with cellular access router 104 in a web browser on computing device 116.

In the depicted embodiment, configuration screen 118 enables a user to register known cellular devices by entering an alias (optional), such as, but not limited to, a name of a person associated with a cellular device in data field 302 and a corresponding mobile identification number in data field 304. Configuration screen 118 provides an "add cellular device" button 306 for registering the entered cellular device. In some embodiments, configuration screen 118 may display a list 308 of registered cellular devices.

Similarly, configuration screen 118 may include a data field 310 for entering an alias of a user specified device for displaying the cellular information associated with the detected cellular devices. In addition, data field 312 enables the user to enter an IP address associated with user specified device. In some embodiments, a Media Access Control address (MAC address) or Ethernet Hardware Address (EHA) of a network adapter or network interface card (NIC) may be used to register a user specified device for displaying the cellular information. Configuration screen 118 provides an "add display device" button 314 for registering the entered user specified device. In addition, in the depicted embodiment, configuration screen 118 includes a registered display devices list 316.

Figure 4:
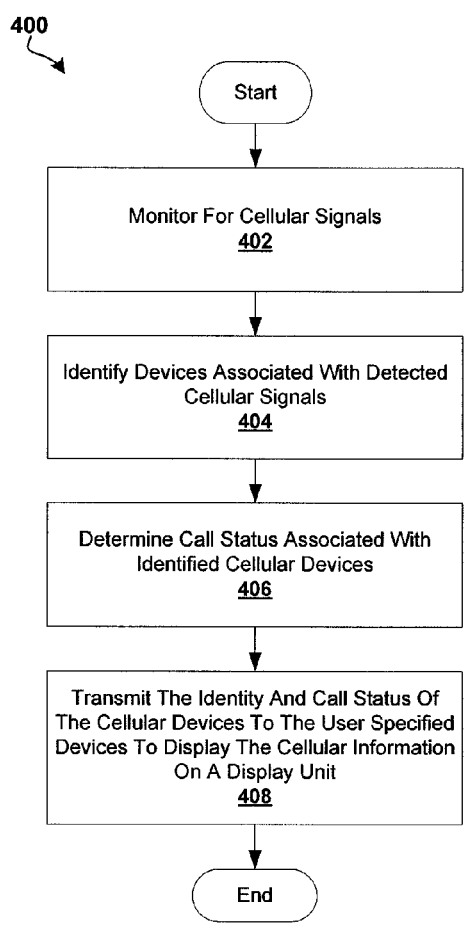
FIG. 4 depicts an embodiment of a process for displaying information associated with a cellular device on a user specified device.

FIG. 4 depicts an embodiment of a process 400 for displaying information associated with a cellular device on a user specified device. In one embodiment, residential cellular access router 104 executes process 400. Process 400 begins by monitoring for cellular signals within the range of the cellular access router at step 402. In response to detecting a cellular signal, the process identifies the cellular device using the special codes/identifier transmitted with the cellular signal at step 404. In some embodiments, the process identifies the mobile identification number associated with the detected cellular signal. In addition, in some embodiments, the process may determine a person/subscriber and/or alias associated with the identified mobile identification number. Additionally, the process determines a call status associated with the identified cellular device. For example, in one embodiment, if the cellular device is on, but not communicating with another communication device, the call status is "inactive". At step 408, the process transmits the identity and call status associated with the detected cellular device to one or more user specified devices to display the cellular information on a display unit, with process 400 terminating thereafter.

Figure 5:
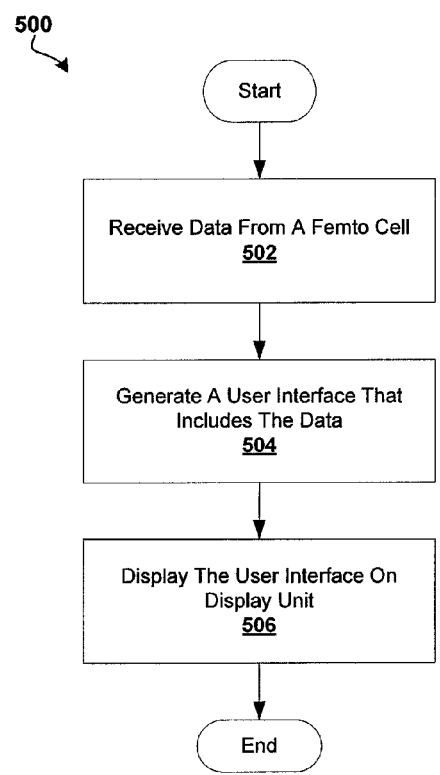
FIG. 5 depicts another embodiment of a process for displaying information associated with a cellular device on a user specified device.

FIG. 5 depicts another embodiment of a process 500 for displaying information associated with a cellular device on a user specified device. In one embodiment, set-top box 200 executes process 500 to display information associated with detected cellular devices on television 114. In this embodiment, process 500 begins by receiving data from a femto cell at step 502. The process generates a user interface that includes the received data at step 504. The process displays the generated user interface on a display unit at step 506, with process 500 terminating thereafter.

Figure 6:
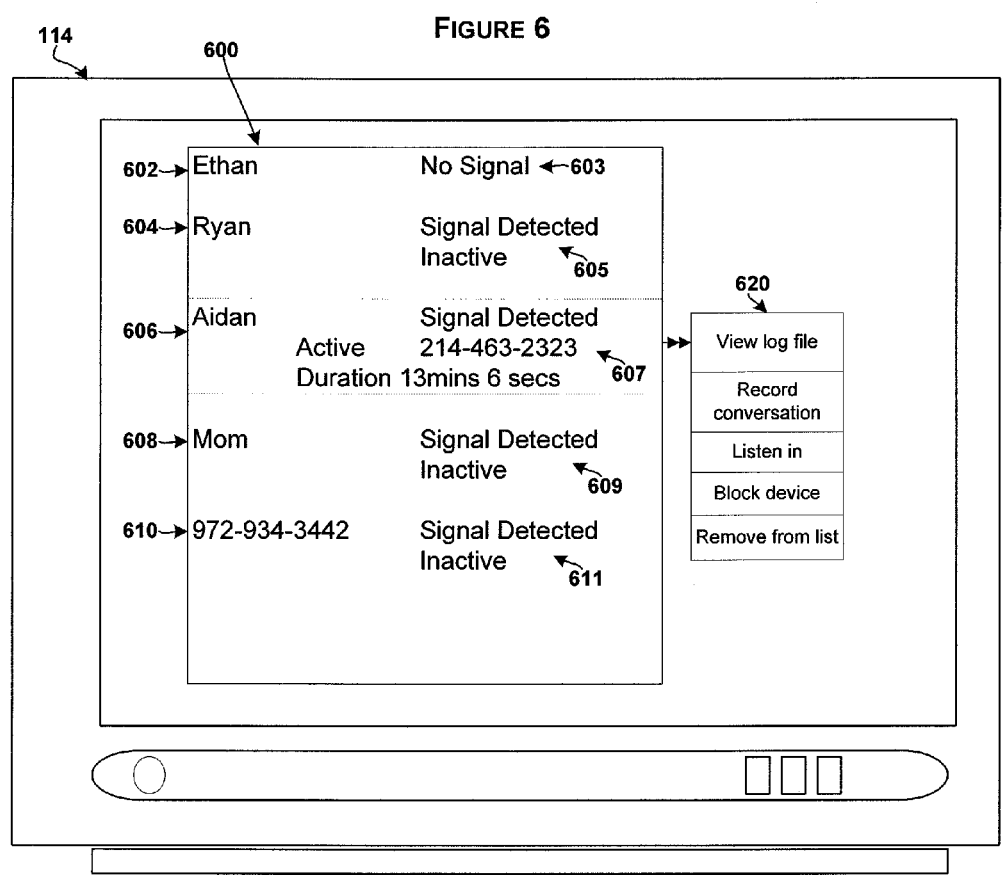
FIG. 6 depicts an embodiment of a user interface for displaying information associated with a cellular device on a user specified device.

FIG. 6 depicts an embodiment of a user interface 600 for displaying information associated with a cellular device on television 114. In the depicted embodiment, user interface 600 displays cellular information associated with registered cellular devices 602, 604, 606, 608, and an unregistered cellular device 610.

User interface 600 indicates, at 603, that cellular access router 104 does not detect a cellular signal associated with registered device 602. User interface 600 indicates, at 605, that cellular access router 104 detects an inactive cellular signal associated with registered device 604. User interface 600 indicates, at 607, that cellular access router 104 detects a cellular signal associated with registered device 606 and that registered cellular device 606 for is currently active. In addition, user interface 600 indicates, at 607, the telephone number associated with a communication device in communication with registered cellular device 606 and the duration of the call. Located at 609, user interface 600 indicates that cellular access router 104 detects an inactive cellular signal associated with registered device 608. In addition, user interface 600 indicates, at 611, that cellular access router 104 detects an inactive signal from an unregistered device 610.

Additionally, in some embodiments, a user may select a particular cellular device to perform one or more user requested options. For example, in one embodiment, in response to selecting registered device 606, options menu 620 appears. In the depicted embodiment, options menu 620 includes an option to view a log file associated with the selected cellular device, record a conversation, listen in to an active call, block a cellular device from using cellular access router 104, and/or remove a listed cellular device from user interface 600.

Accordingly, the disclosed embodiments present a system and method for displaying information associated with the cellular device on a display unit. In one embodiment, the method includes monitoring for a signal transmitted by a cellular device. In response to detecting the signal from the cellular device, the method determines an identity and a call status of the cellular device from data associated with the signal. The method transmits the identity and the call status of the cellular device to a user specified device to display the identity and the call status on the display unit associated with the user specified device.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for displaying information associated with a cellular device on a display unit, the method comprising:
   monitoring for a signal transmitted by a cellular device operating within range of a femto cell that is configured to detect a cellular signal within a specified range covering a residential location;
   responsive to the femto cell detecting a signal from a cellular device, determining from data associated with the signal;
   an identity of the detected cellular device;
   a call status of the detected cellular device, wherein the call status comprises determining whether the detected cellular device is actively communicating with another communications device located outside of the range of the femto cell during the active communication with the detected cellular device; and
   a duration of the active communication; and
   transmitting the identity, the call status and the duration of the active communication of the cellular device from the femto cell to a user specified device for displaying the identity, the call status and the duration of the active communication on a display unit.

2. The method of claim 1, wherein the user specified device is a set-top box and the display unit is a television.

3. The method of claim 1, wherein the user specified device is a personal computer.

4. The method of claim 1, wherein the user specified device is a communication device.

5. The method of claim 1, further comprising:
   determining a phone number associated with a communication device that is in communication with the cellular device; and
   transmitting the phone number along with the identity and the call status of the cellular device to the user specified device to display the identity, the call status, and the phone number associated with the communication device that is in communication with the cellular device on the display unit.

6. The method of claim 1, further comprising:
   maintaining a log file that includes a time interval of when the cellular device is detected.

7. The method of claim 1, further comprising:
   maintaining a log file that includes calling activities associated with the cellular device, the calling activities including a call time, call duration, and a phone number associated with a communication device in communication with the cellular device.

8. The method of claim 1, further comprising:
   maintaining a log file that includes calling activities associated with the cellular device, the calling activities including a call time, call duration, and a phone number associated with a communication device in communication with the cellular device;
   responsive to receiving a user request to display information associated with a log file, retrieving the log file associated with the cellular device; and
   transmitting the information associated with log file to the user specified device to display the information associated with the log file on the display unit.

9. The method of claim 1, further comprising:
   responsive to receiving a user request to record audio, recording the audio associated with communications made with the cellular device.

10. The method of claim 1, further comprising:
responsive to receiving a user request to listen to an active call, playing audio associated with the active call on an audio output device associated with the user specified device.

11. The method of claim 1, wherein the steps of monitoring, determining, and transmitting are performed by a femto cell.

12. The method of claim 11, further comprising registering with the femto cell an identifier associated with the cellular device.

13. The method of claim 11, further comprising registering with the femto cell an IP address associated with the user specified device.

14. The method of claim 11, further comprising:
responsive to receiving a user request to block a detected cellular device; and
disallowing the detected cellular device from communicating over the femto cell.

15. A method for displaying information associated with a cellular device on a display unit, the method comprising:
receiving data from a femto cell, the data including;
an identity of a detected cellular device;
a call status of the detected cellular device, wherein the call status comprises a determination of whether the detected cellular device is actively communicating with another communications device located outside of the range of the femto cell during the active communication with the detected cellular device; and
a duration of the active communication; and
generating a user interface that includes the data; and
displaying the user interface on the display unit.

16. The method of claim 15, wherein displaying the user interface on the display unit comprise overlaying the user interface over an image depicted on the display unit.

17. A femto cell comprising:
memory in communication with a processing unit, the memory including computer usable program code, and the processing unit configured to execute the computer usable program code to:
monitor for a signal transmitted by a cellular device operating within range of the femto cell;
responsive to the femto cell detecting the signal from a cellular device, determine from data associated with the signal;
an identity of the detected cellular device;
a call status of the detected cellular device, wherein the call status comprises determining whether the detected cellular device is actively communicating with another communications device located outside of the range of the femto cell during the active communication with the detected cellular device; and
a duration of the active communication; and
transmit the identity, the call status and the duration of the active communication of the cellular device from the femto cell to a user specified device for displaying the identity, the call status and the duration of the active communication on a display unit.

18. The femto cell of claim 17, wherein the processing unit further executes the computer usable program code to register an identifier associated with the cellular device.

19. The femto cell of claim 17, wherein the processing unit further executes the computer usable program code to register an IP address associated with the user specified device.

20. The femto cell of claim 17, wherein the processing unit further executes the computer usable program code to maintain a log file that includes calling activities associated with the cellular device, the calling activities including a call time, call duration, and a phone number associated with a communication device in communication with the cellular device.

* * * * *